United States Patent [19]
Fersht et al.

[11] Patent Number: 5,815,266
[45] Date of Patent: Sep. 29, 1998

[54] SENSING METHOD AND APPARATUS

[75] Inventors: Samuel N. Fersht, Studio City; Donald A. Frederick, Woodland Hills, both of Calif.

[73] Assignee: Litton Systems, Inc., Woodland Hills, Calif.

[21] Appl. No.: 749,565

[22] Filed: Nov. 15, 1996

[51] Int. Cl.[6] .................................................... G01B 9/02
[52] U.S. Cl. ........................... 356/345; 356/35.5; 385/12
[58] Field of Search .................................... 356/345, 352, 356/35.5; 385/12, 14

[56] References Cited

U.S. PATENT DOCUMENTS 5,216,532  6/1993  Taylor ...................................... 356/345

*Primary Examiner*—Frank G. Font
*Assistant Examiner*—Robert Kim
*Attorney, Agent, or Firm*—Robert E. Malm

[57] ABSTRACT

The invention is a method and apparatus for determining the phase difference of light waves after propagating through each of one or more two-path pairs, a two-path pair being two optical transmission paths connecting a common entry point to a common exit point. Coherent light pulses of predetermined duration are fed into the entry point of each two-path pair in a group of two-path pairs at predetermined time intervals, the pulse duration being subdivided into a plurality of predetermined time segments. The light has a different frequency during each time segment. The light pulses at the exit points of the two-path pairs are delayed by predetermined time increments and then combined into a combination light signal. The combination light signal is converted into an electrical signal, the amplitude of the electrical signal as a function of time being proportional to the combination-light-signal power as a function of time. The phase difference for each two-path pair is determined from amplitude values of the electrical signal.

26 Claims, 2 Drawing Sheets

SENSING METHOD AND APPARATUS

BACKGROUND OF THE INVENTION

This invention relates generally to fiber-optic interferometers for use in detecting temperature and pressure fluctuations and more specifically to methods and apparatus for driving the interferometers with suitably modulated light signals and extracting the sensed information.

A fiber-optic interferometer consists of two optical fibers joined together at the ends so that light can enter the two fibers from a common input port and can exit from a common output port. The sensing process involves driving the interferometer with light introduced at the input port and detecting the light power emerging from the output port. The two optical fibers being physically displaced from each other will be affected differently by disturbances in the environment in which they are located, and the light waves that propagate through the two fibers will experience amplitude and phase changes characteristic of their different environments. The magnitude of the power of the combined light wave at the output port will reflect these amplitude and phase changes and can be used to sense disturbances in the environment.

Driving the interferometer with unmodulated light makes the detection of amplitude and phase changes at the output of the interferometer extremely difficult in that it requires extremely stable electronic circuitry. In order to avoid this problem, the light that enters the interferometer is typically phase modulated thereby causing the desired environmental phase and amplitude changes to appear as sidebands to a carrier frequency. This approach works well with a single interferometer. However, there are difficulties in driving a number of interferometers in a time-division-multiplex mode in that it requires the analog modulating signal be accurately reproduced for the demodulation process.

SUMMARY OF THE INVENTION

The invention is a method and apparatus for determining the phase difference of light waves after propagating through each of one or more two-path pairs, a two-path pair being two optical transmission paths connecting a common entry point to a common exit point. Coherent light pulses of predetermined duration are fed into the entry point of each two-path pair in a group of two-path pairs at predetermined time intervals, the pulse duration being subdivided into a plurality of predetermined time segments. The light has a different frequency during each time segment. The light pulses at the exit points of the two-path pairs are delayed by predetermined time increments and then combined into a combination light signal. The combination light signal is converted into an electrical signal, the amplitude of the electrical signal as a function of time being proportional to the combination-light-signal power as a function of time. The phase difference for each two-path pair is determined from amplitude values of the electrical signal.

DESCRIPTION OF THE PREFERRED EMBODIMENTS

Figure 1:
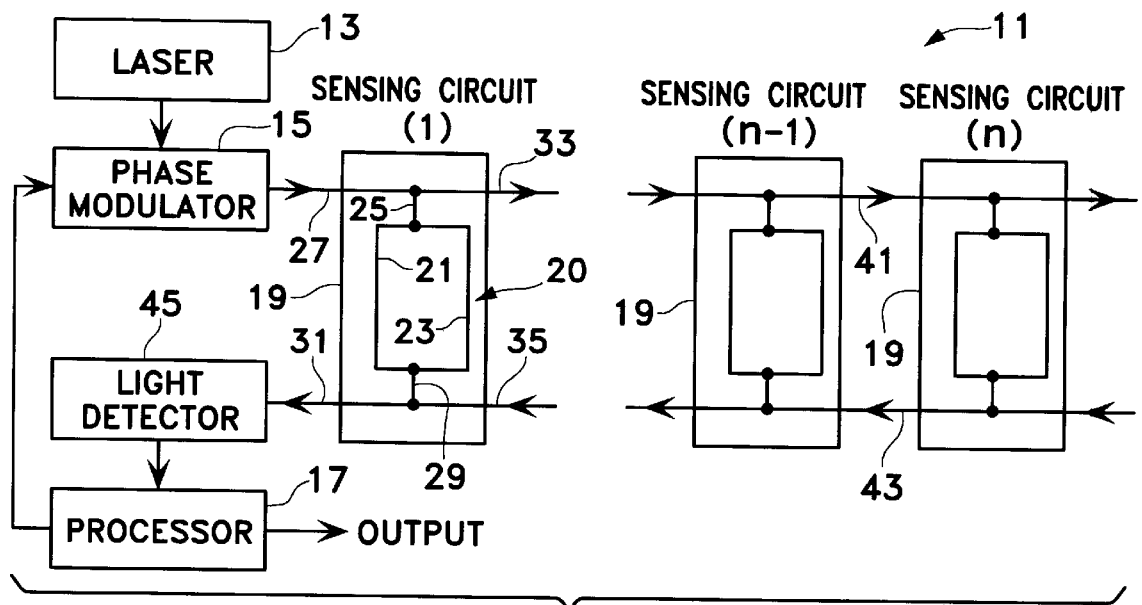
FIG. 1 is a block diagram of a first embodiment of the invention.

The preferred embodiment of a sensing circuit array 11 is shown in FIG. 1. The laser 13 supplies coherent light through an optical fiber to the phase modulator 15. The processor 17 supplies a modulating signal to the phase modulator 15 which causes a constant-amplitude pulse of light of duration T(X) to issue periodically from the phase modulator, X denoting a particular configuration. The processor 17 also causes the frequency of the light to have a plurality of different values during successive equal segments of the pulse by driving the phase modulator 15 with a particular voltage ramp during each segment. The frequency of the light is changed as it passes through the phase modulator 15 in proportion to the time rate-of-change of the driving signal. Typically, the pulse might have three or our segments and T(X) might typically be 500 ns more or less.

The light pulse issuing from the phase modulator 15 drives N identical sensing circuits 19. Each sensing circuit 19 has a two-path pair 20 of optical fibers 21 and 23 joined together at the ends. The two optical fibers differ in length by a time equivalent of $\Delta t$. The two-path pair connects at the input end 25 to an input port 27 and at the output end 29 to an output port 31. The input port 27 also connects to an input-line output port 33. The division of power between input end 25 and input-line output port 33 is in the ratio of 1 to N or more. An output-line input port 35 also connects to output port 31. Typical sensing circuits (n−1) and (n) are optically connected by optical fibers 41 and 43 which together have a total length equivalent to a propagation time of T(X,n). The pulse length T(X) is less than or equal to T(X,n) for all values of n.

The light pulse that enters the input port 27 of sensing circuit (1) divides among the N sensing circuits, and the N pulses from the N sensing circuits combine and enter the input port of the light detector 45. The N pulses that enter the light detector 45 are non-overlapping since $T(X) \leq T(X,n)$. The light detector 45 converts the input light signal into an output electrical signal having an amplitude as a function of time that is proportional to the input light power as a function of time. The output of the light detector 45 enters the processor 17 which determines the phase difference of the light waves that travel through the two fibers that comprise each two-path pair 20 in each sensing circuit 19.

The output of the light detector 45 P(p,n) corresponding to the pulse from sensing circuit n when the light frequency is F(p), p being an integer that identifies a particular frequency, is given by $$P(p,n) = A(n) + B(n)\cos[2\pi F(p)\Delta t + \Delta\phi] \quad (1)$$

where A(n) and B(n) are constants proportional to the input power to the two-path pair, B(n) also depends on the mixing efficiency of the two-path pair, and $\Delta\phi$ is a phase change introduced by an environmental disturbance. There are three unknowns in the equation—A(n), B(n), and $\Delta\phi$. By measuring P(p,n) for three different frequencies, the three equations in three unknowns can be solved for A(n), B(n), and $\Delta\phi$.

By properly choosing the frequencies, the solution can be obtained rather easily. Let F(p) be defined by the equation $$F(p) = F(0) + p\Delta F \quad (2)$$

where $\Delta F$ is a constant. Let p take on the values −1, 0, and 1. Then $$\sin[2\pi F(0)\Delta t + \Delta\phi] = -\frac{P(1,n) - P(-1,n)}{2B\sin(2\pi\Delta F\Delta t)} \quad (3)$$

$$\cos[2\pi F(0)\Delta t + \Delta\phi] = -\frac{P(1,n) + P(-1,n) - 2P(0,n)}{2B[1 - \cos(2\pi\Delta F\Delta t)]} \quad (4)$$

$$\tan[2\pi F(0)\Delta t + \Delta\phi] = \quad (5)$$

$$\frac{1 - \cos(2\pi\Delta F\Delta t)}{\sin(2\pi\Delta F\Delta t)} \quad \frac{P(1,n) - P(-1,n)}{P(1,n) + P(-1,n) - 2P(0,n)}$$

If $\Delta F \Delta t$ equals ¼, the first term on the right of the last equation equals 1 and the equation becomes even simpler.

An alternative expression for equation (5) can be obtained by using four frequencies with p taking on the values −1, 0, 1, and 2. Then, $$\cot[2\pi F(0)\Delta t + \Delta\phi] = \quad (6)$$

$$\frac{1}{\sin(2\pi\Delta F\Delta t)} \left[ \frac{P(2,n) - P(0,n)}{P(1,n) - P(-1,n)} - \cos(2\pi\Delta F\Delta t) \right]$$

If $\Delta F \Delta t$ equals ¼, the sine term equals 1, the cosine term equals 0, and the equation once again becomes simpler.

The value of $\Delta F \Delta t$ can be maintained equal to ¼ by maintaining $\delta$ equal to 0 where $$\delta = 2\pi\Delta F\Delta t - \frac{\pi}{2} = \quad (7)$$

$$-\frac{1}{2B} \frac{P(1,n) + P(-1,n) - P(2,n) - P(0,n)}{\sin[F(0)\Delta t + \Delta\phi] + \cos[F(0)\Delta t + \Delta\phi]}$$

The quantities in the denominator can be obtained from equations (3) and (4). The value of B does not need to be determined in order to drive $\delta$ to 0.

Figure 2:
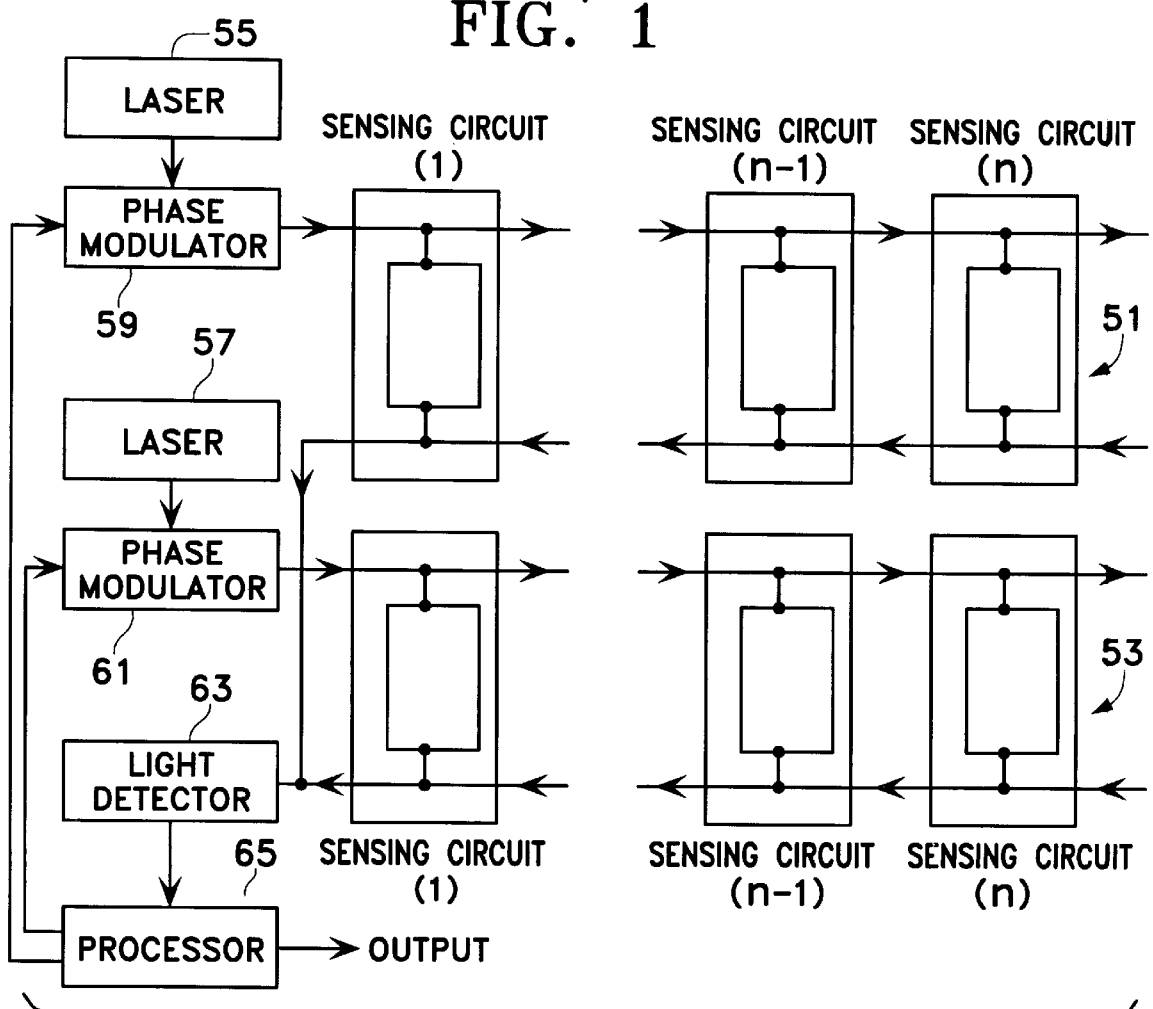
FIG. 2 is a block diagram of a second embodiment of the invention.
Figure 3:
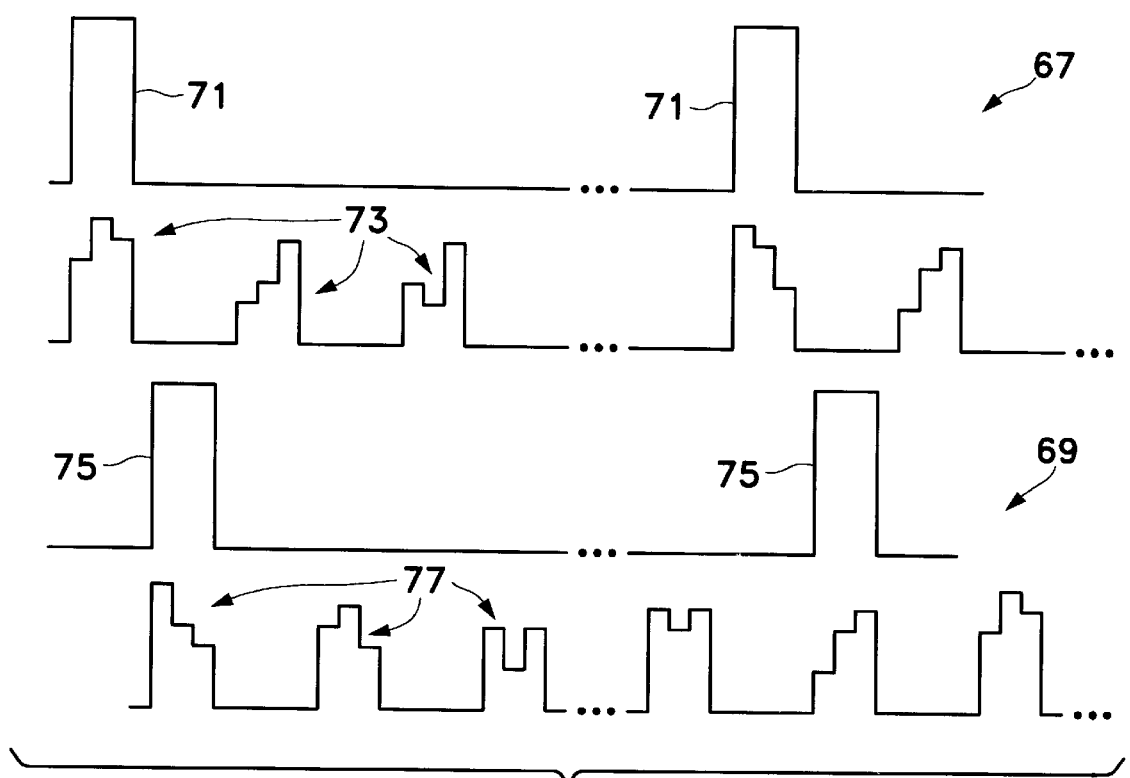
FIG. 3 shows the waveforms associated with the operation of the first embodiment of the invention.

A number of laser-driven arrays of sensing circuits can be multiplexed and serviced by the same light detector and processor as shown in FIG. 2. Sensing circuit arrays 51 and 53 have dedicated lasers 55 and 57 respectively and dedicated phase modulators 59 and 61 respectively but share a common light detector 63 and a common processor 65. The multiplexing of the operations of the two sensing circuit arrays can be accomplished in a number of ways. One way is illustrated in FIG. 3 which shows the light pulses 67 associated with sensing circuit array 51 and light pulses 69 associated with sensing circuit array 53 time-division multiplexed so as not to interfere with one another. The pulses 71 leaving phase modulator 59 are followed by pulses 75 leaving phase modulator 61. The times T(X,n) for the two sensing circuit arrays are chosen such that the pulses 73 associated with sensing circuit array 51 and the pulses 77 associated with sensing circuit array 53, that appear at the input of light detector 63, do not overlap. The changes in amplitude from segment to segment of the individual pulses making up the pulse trains 73 and 77 result from the changes in light frequency from segment to segment.

Figure 4:
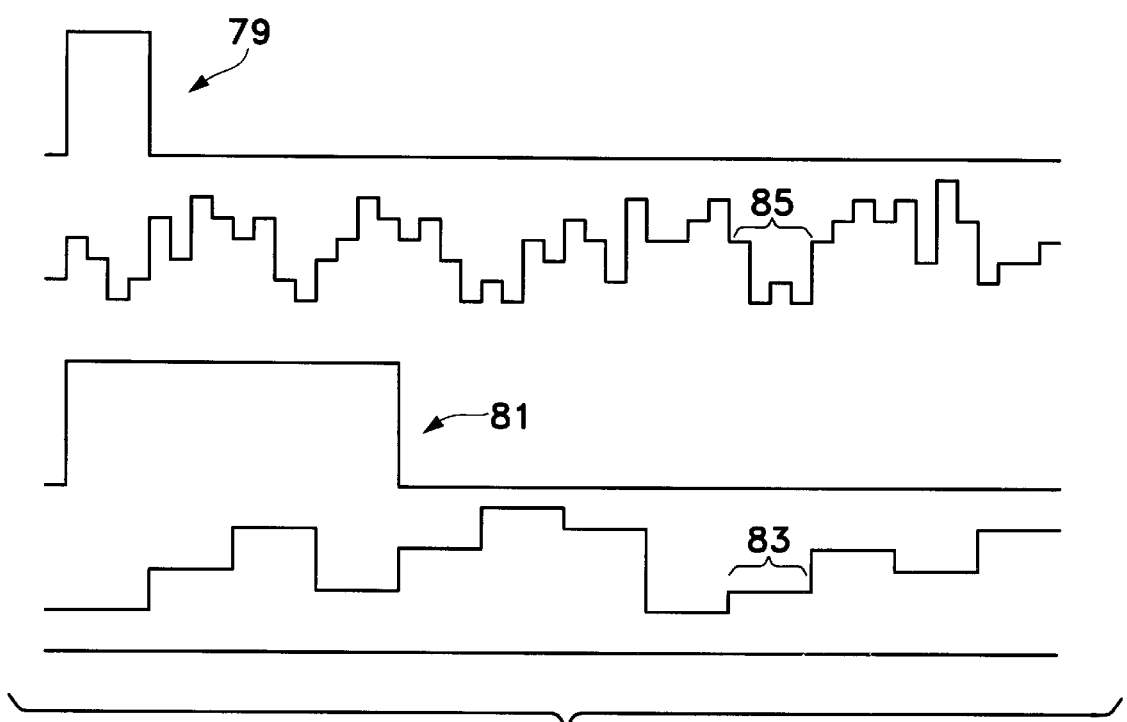
FIG. 4 shows the waveforms associated with the operation of the second embodiment of the invention.

Another approach to multiplexing is the form of code division shown in FIG. 4. The pulse 79 associated with sensing circuit array 51 is a four-segment pulse and has one-fourth the duration of the pulse 81 associated with sensing circuit array 53. Pulse 81 is also a four-segment pulse. The ratio of the pulse durations is purposely made equal to the number of segments in the pulses. The propagation times T(51,n) and T(53,n) are chosen such that each segment 83 of a pulse from sensing circuit array 53 appearing at the input to light detector 63 coincides with a pulse 85 from sensing circuit array 51. The presence of the constant-frequency-light pulse segment 83 will not interfere with the determination of the phase $2\pi F(0)\Delta t + \Delta\phi$ associated with pulse 85 since pulse segment 83 simply adds a constant power to each of the segments in pulse 83. Conversely, if $\Delta F \Delta t$ is equal to ¼, then the average power of pulse 85 will be constant for each segment 83, and the phase $2\pi F(0)\Delta t + \Delta\phi$ associated with each pulse 83 can be determined using the algorithms described above.

Any combination of segment durations can be used as long as they are "orthogonal" to one another in the sense of having the powers in each one of the pulse trains average to a constant over integration times appropriate for sampling of each of the other pulse trains.

The embodiments of the invention have been described in terms of two-path pairs consisting of optical fibers. However, the principles of the invention apply to any light transmission mechanism by which light waves can be split into two parts at an entry point and thereon follow two distinct paths of different lengths to an exit point where they are once again combined.

What is claimed is:

1. Sensing apparatus (A) having a configuration identified as A comprising:

a light modulator (A) having a control input port, a light input port, and a light output port, the light input port of the light modulator (A) being adapted to receive a coherent light beam;

one or more sensing circuits (A,n), the value of n denoting a particular sensing circuit, n taking on integer values from 1 to N, N being equal to or greater than 1, each sensing circuit (A,n) having an input port, an output port, zero or more input-line output ports, zero or more output-line input ports, and a two-path pair consisting of two optical transmission paths from the input port to the output port, the light output port of the light modulator (A) being optically connected to the input port of the sensing circuit (A,1), an input-line output port of sensing circuit (A,n−1) being optically connected to the input port of sensing circuit (A,n) by optical transmission medium (A,n,1) if N and n are greater than 1, the output port of sensing circuit (A,n) being optically connected to an output-line input port of sensing circuit (A, n−1) by optical transmission medium (A,n,2) if N and n are greater than 1, the combination of optical transmission medium (A,n,1) and optical transmission medium (A,n,2) representing a propagation time of T(A,n);

a light detector having one or more input ports and an output port, light entering the one or more input ports being combined, the output port of sensing circuit (A,1) being optically connected to the input port of the light detector, the light detector producing an electrical signal at its output port with an amplitude as a function of time proportional to the combined input light power as a function of time;

a processor having an input port, one or more control output ports, and a data output port, the output port of the light detector being connected to the input port of the processor, one of the one or more control output ports of the processor being connected to the control input port of the light modulator (A), the processor causing a light pulse with duration T(A) to periodically exit the light output port of the light modulator (A), T(A) being equal to or less than T(A,n) for all values of n greater than 1, the light frequency having a plurality of different values F(A,p) during the light pulse, p taking on integer values that identify the plurality of different values, the output of the light detector produced by the sensing apparatus (A) when the light frequency is F(A,p) being denoted by P(A,n,p), n denoting the particular sensing circuit, the processor determining the difference in phase for the two light paths comprising each two-path pair using the values P(A,np), the differences in phase being made available at the output port of the processor.

2. The sensing apparatus of claim 1 wherein the difference in propagation times for light waves traversing the two paths of each two-path pair are predetermined values $\Delta t(A,n)$, $F(A,p)=F(A,0)+p\Delta F$ where $F(A,0)$ is a reference frequency, and $\Delta F$ is a predetermined frequency increment.

3. The sensing apparatus of claim 2 wherein p takes on any three consecutive integer values in any order during a pulse.

4. The sensing apparatus of claim 3 wherein $\Delta F \Delta t(A,n)$ is nominally equal to ¼.

5. The sensing apparatus of claim 2 wherein p takes on any four consecutive integer values in any order during a pulse.

6. The sensing apparatus of claim 5 wherein $\Delta F \Delta t(A,n)$ is nominally equal to ¼.

7. The sensing apparatus of claim 6 wherein the processor maintains $\Delta F$ at a value such that $\Delta F \Delta t(A,n)$ approximately equals ¼ using an error signal obtained from the values of P(A,n,p).

8. The sensing apparatus (A) of claim 1 in combination with sensing apparatus (B) comprising:
  a light modulator (B) having a control input port, a light input port, and a light output port, the light input port of the light modulator (B) being adapted to receive a coherent light beam;
  one or more sensing circuits (B,m), the value of m denoting a particular sensing circuit, m taking on integer values from 1 to M, M being equal to or greater than 1, each sensing circuit (B,m) having an input port, an output port, zero or more input-line output ports, zero or more output-line input ports, and a two-path pair consisting of two optical transmission paths from the input port to the output port, the light output port of the light modulator (B) being optically connected to the input port of the sensing circuit (B,1), an input-line output port of sensing circuit (B,m−1) being optically connected to the input port of sensing circuit (B,m) by optical transmission medium (B,m,1) if M and m are greater than 1, the output port of sensing circuit (B,m) being optically connected to an output-line input port of sensing circuit (B,m−1) by optical transmission medium (B,m,2) if M and m are greater than 1, the output port of the sensing circuit (B,1) being optically connected to an input port of the light detector, the combination of optical transmission medium (B,m,1) and optical transmission medium (B,m,2) representing a propagation time of T(B,m);
  one of the one or more control output ports of the processor being connected to the control input port of the light modulator (B), the processor causing a light pulse with duration T(B) to periodically exit the light output port of the light modulator (B), T(B) being equal to or less than T(B,m) for all values of m greater than 1, the light frequency having a plurality of different values F(B,q) during the light pulse, q taking on integer values that identify the plurality of different values, q changing value only after p has cycled through all of its values, the output of the light detector produced by the sensing apparatus (B) when the light frequency is F(B,q) being denoted by P(B,m,q), the processor determining the difference in phase for the two light paths comprising each two-path pair in sensing circuits (A,n) and (B,m) using the values of P(A,n,p) and P(B,m,q), the differences in phase being made available at the output port of the processor.

9. The sensing apparatus of claim 8 wherein the difference in propagation time for light waves traversing the two paths of each two-path pair in sensing apparatus (A) and sensing apparatus (B) are predetermined values $\Delta t(A,n)$ and $\Delta t(B,m)$, $F(A,p)=F(A,0)+p\Delta F$ and $F(B,q)=F(B,0)+q\Delta F$ where $F(A,0)$ and $F(B,0)$ are reference frequencies; and $\Delta F$ is a predetermined frequency increment.

10. The sensing apparatus of claim 9 wherein p and q take on any three consecutive integer values in any order during a pulse.

11. The sensing apparatus of claim 10 wherein $\Delta F \Delta t(A,n)$ and $\Delta F \Delta t(B,m)$ are nominally equal to ¼.

12. The sensing apparatus of claim 9 wherein p and q take on any four consecutive integer values in any order during a pulse.

13. The sensing apparatus of claim 12 wherein $\Delta F \Delta t(A,n)$ and $\Delta F \Delta t(B,m)$ are nominally equal to ¼.

14. The sensing apparatus of claim 13 wherein the processor maintains $\Delta F$ at a value such that $\Delta F \Delta t(A,n)$ and $\Delta F \Delta t(B,m)$ approximately equal ¼ using an error signal obtained from the values of P(A,n,p) and P(B,m,q).

15. The sensing apparatus of claim 8 wherein the light pulses from sensing apparatus (A) and sensing apparatus (B) are nonoverlapping at the input ports of the light detector.

16. The sensing apparatus of claim 8 wherein the output of the light detector is separable into components Q(A,n)+P(A,n,p) and Q(B,m)+P(B,m,q) where Q(A,n) and Q(B,m) are bias terms independent of p and q.

17. A method for determining the phase difference of light waves after propagating through each of one or more two-path pairs, a two-path pair being two optical transmission paths connecting a common entry point to a common exit point, the light waves being in phase at the entry point, the method comprising:
  (a1) feeding coherent light pulses of predetermined duration into the entry point of each two-path pair in a group A of two-path pairs at predetermined time intervals, the pulse duration being subdivided into a plurality of predetermined time segments, the light having a different frequency during each time segment, the light pulses at the exit points of the two-path pairs being delayed by predetermined time increments and then combined into a group-A combination light signal;
  (b) converting the combination light signal into an electrical signal, the amplitude of the electrical signal as a function of time being proportional to the combination-light-signal power as a function of time;
  (c) determining the phase difference for each two-path pair from amplitude values of the electrical signal.

18. The method of claim 17 wherein the difference in propagation times for light waves traversing the two paths of each two-path pair in the absence of environmental disturbances are predetermined and the light frequency during a time segment is equal to the sum of a reference frequency and the product of a positive or negative integer or zero and a frequency increment.

19. The method of claim 18 wherein a light pulse consists of three time segments, the light frequency during the three segments being specified by three consecutive integers taken in any order.

20. The method of claim 19 wherein the product of the difference in propagation times for a two-path pair and the frequency increment is nominally equal to ¼.

21. The method of claim 18 wherein a light pulse consists of four segments, the light frequency during the four segments being specified by four consecutive integers taken in any order.

22. The method of claim 21 wherein the product of the difference in propagation times for a two-path pair and the frequency increment is nominally equal to ¼.

23. The method of claim 22 further comprising:

(d) adjusting the frequency increment so that the product of the difference in propagation times for a two-path pair and the frequency increment is approximately equal to ¼ using an error signal obtained from amplitude values of the electrical signal.

24. The method of claim 17 further comprising:

(a2) feeding coherent light pulses of predetermined duration into the entry point of each two-path pair in a group B of two-path pairs at predetermined time intervals, the pulse duration being subdivided into a plurality of predetermined time segments, the light having a different frequency during each time segment, the light pulses at the exit points of the two-path pairs being delayed by predetermined time increments and then combined into a group-B combination light signal;

(a3) combining the group-A combination light signal and the group-B combination light signal into a single group-A and group-B combination light signal subject to the operations performed in steps (b) and (c), the predetermined pulse durations, the predetermined time segments, the predetermined time intervals, and the predetermined time increments for the group-A and the group-B two-path pairs being chosen such that the phase differences for the group-A and group-B two-path pairs can be determined from the electrical signal.

25. The method of claim 24 wherein the light pulses in the group-A and group-B combination light signal do not overlap.

26. The method of claim 24 wherein the group-A light pulses overlap the group-B light pulses in the group-A and group-B combination light signal, the result being a fixed bias in the average amplitude of the electrical signal during a pulse segment for either a group-A light pulse or a group-B pulse.

* * * * *